(12) United States Patent  (10) Patent No.: US 7,971,069 B2
Yellepeddy  (45) Date of Patent: *Jun. 28, 2011

(54) SECURITY SYSTEM FOR REPLICATED STORAGE DEVICES ON COMPUTER NETWORKS

(75) Inventor: Krishna Kishore Yellepeddy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1030 days.

This patent is subject to a terminal disclaimer.

(21) Appl. No.: 11/548,573

(22) Filed: Oct. 11, 2006

(65) Prior Publication Data

US 2007/0174456 A1    Jul. 26, 2007

Related U.S. Application Data

(63) Continuation of application No. 10/262,499, filed on Sep. 30, 2002, now Pat. No. 7,146,499.

(51) Int. Cl.
 *H04L 9/32* (2006.01)
(52) U.S. Cl. ............ 713/189; 713/193; 726/26; 726/29
(58) Field of Classification Search .................. 726/2–7, 726/26, 29, 9; 713/150, 161, 167–168, 170–171, 713/165, 189–190, 193; 380/255, 259, 277, 380/264, 283
 See application file for complete search history.

(56) References Cited

U.S. PATENT DOCUMENTS

| 5,495,533 | A | 2/1996 | Linehan et al. |
|---|---|---|---|
| 5,602,918 | A | 2/1997 | Chen et al. |
| 5,677,952 | A | 10/1997 | Blakley, III et al. |
| 5,748,744 | A | 5/1998 | Levy et al. |
| 5,931,947 | A | 8/1999 | Burns et al. |
| 6,268,789 | B1 | 7/2001 | Diamant et al. |
| 6,405,315 | B1 | 6/2002 | Burns et al. |
| 6,898,288 | B2 * | 5/2005 | Chui .............................. 380/278 |
| 7,031,491 | B1 * | 4/2006 | Donescu et al. .............. 382/100 |
| 7,146,499 | B2 * | 12/2006 | Yellepeddy ................... 713/165 |
| 2002/0049825 | A1 | 4/2002 | Jewett et al. |
| 2002/0078345 | A1 | 6/2002 | Sandhu et al. |

OTHER PUBLICATIONS

RSA Laboratories; "3.6.1 What is Diffie-Hellman?", downloaded on Sep. 20, 2002 from http://www.nsasecurity.com; 3 pages.

Techtarget.Com; "Data Encryption Standard" definition downloaded from http://www.SearchSecurity.TechTarget.com on Sep. 18, 2002, 3 pages.

USPTO; examination correspondence in related patent U.S. Appl. No. 10/262,499, filed Sep. 20, 2002, now issued as US Patent 7,146,499, retrieved from USPTO Pair Image File Wrapper on Jan. 28, 2010.

* cited by examiner

*Primary Examiner* — Hosuk Song
(74) *Attorney, Agent, or Firm* — Robert H. Frantz; Jeffrey S. LaBaw

(57) ABSTRACT

A replicated networked storage domain of an original data partition and one or more replica data partitions in which each partition is stored on a storage device having a network address, is secured by associating with each partition a secret key; sharing the secret keys between the storage devices and a file manager; requesting access to a specific partition by a client; and accessing the specific partition by the client using a credential encrypted by the key associated with the specific partition and including a network address of a storage device which stores the partition.

20 Claims, 9 Drawing Sheets

SECURITY SYSTEM FOR REPLICATED STORAGE DEVICES ON COMPUTER NETWORKS

CROSS-REFERENCE TO RELATED APPLICATIONS (CLAIMING BENEFIT UNDER 35 U.S.C. 120)

This application is a continuation of U.S. patent application Ser. No. 10/262,499, filed on Sep. 30, 2002, by Krishna Kishore Yellepeddy, which is now issued as U.S. Pat. No. 7,146,499.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Not applicable.

BACKGROUND OF THE ART

1. Field of the Invention

This invention relates to but is not limited to the fields of networked storage technology, online storage security methods, replicated storage systems, and load balancing processes.

2. Background of the Invention

Storage devices have "stepped out" from behind the protection of servers to be connected directly to the network rather than being connected to the network through a storage server, as shown in FIG. 3. Under the older scheme of networked storage, a storage server (34) provided access over a computer network (31) such as a local area network ("LAN") or the Internet to one or more storage resources (35) for one or more client systems (32, 33). In this older arrangement, the storage server could enforce access privileges for clients to the storage resources, or deny access to or modification of data stored in the resources.

Using newer network storage devices which are capable of being directly interfaced to a computer network (31) without the intervening support of a storage server, clients (32, 33) may now access data residing on Network Storage Devices ("NSD") (36, 37) with minimal intervention from a file manager (38).

There is, however, still a need to provide proper access control, privacy and data integrity while accessing this data from a client. The need to protect enterprise data, databases, web objects and program files does not change even though the hardware arrangement has been improved from the older, storage server-based arrangement.

Additionally, there is a need for mechanisms and processes that limit the damage done as a result of a security breach. Some of these security issues have been addressed for individual storage devices such as ownership, authorization, and authentication schemes. However, there is a need for online storage systems which allow efficient recovery from breaches in security and hardware failures, as well as a need to make these storage devices highly available and scalable.

Replication is a well-known process employed to provide rapid data recovery, high availability, and storage system scalability in networked storage arrangements. Replication includes creating and managing duplicate versions of data, files and databases. The set of replicas are not only initially copied from an original, but are continuously synchronized to reflect the current state of the original. Thus, modifications or additions to the original data are "replicated" to the replicas by a replication manager (41) as shown in the enhanced arrangement (40) of FIG. 4.

So, in this figure, an original database may be stored on a first NSD (36), and a replica may be managed on a second NSD (37). To provide minimized possibilities of losing both the original and replica data, the replicas are typically maintained in a geographically disparate arrangement with the original so that an event such as a flood, earthquake, power outage, etc., at one site will not take out all the replicas. For high availability, the file manager (38) may quickly reconfigure to use a replica as the original after such an event.

Scalability is provided in this arrangement as the replication manager (41) may distribute portions of the original onto multiple storage devices, thus realizing a replica which is comprised of multiple portions on multiple storage devices. As the original data amount grows, additional portions of replica data may also easily be added with additional storage devices. For rapid recovery from a loss of some (or all) the original data, the replication manager (41) may direct all accesses to the data to the appropriate replica portion.

Data storage systems often organize (50) data into logical volumes (51), as shown in FIG. 5. Each logical volume has one or more aggregators (52) which are responsible for combining one or more partitions (54-59). Each partition may be stored separately on a storage device (503), or with other partitions on a storage device (501, 502). A "pass through" layer (500) provides hardware to software mapping and interfacing such that from the perspective of software accesses to the logical volume, different types of storage devices (e.g. hard drives, RAM, cache, removable storage, tape, etc.) appear within the logical volume equally accessible and well organized. Replication systems, such as the well-known IBM Lotus Notes product, handle replication within such networked storage arrangements well.

Existing security systems allow for controlled access to and modification of data in networked storage devices either through a storage server (34) in the older arrangement, or by ownership at a hardware (e.g. device) level for directly connected storage devices (36, 37). As such, if security for a specific NSD is comprised, the data of the entire NSD may be lost or corrupted.

Therefore, there is a need in the art for a security system replicated online data storage arrangement which is not susceptible to device-level security breaches while maintaining the high availability, quick recovery and scalability of such replicated storage systems.

BRIEF DESCRIPTION OF THE DRAWINGS

The following detailed description when taken in conjunction with the figures presented herein provide a complete disclosure of the invention.

SUMMARY OF THE INVENTION

Figure 1:
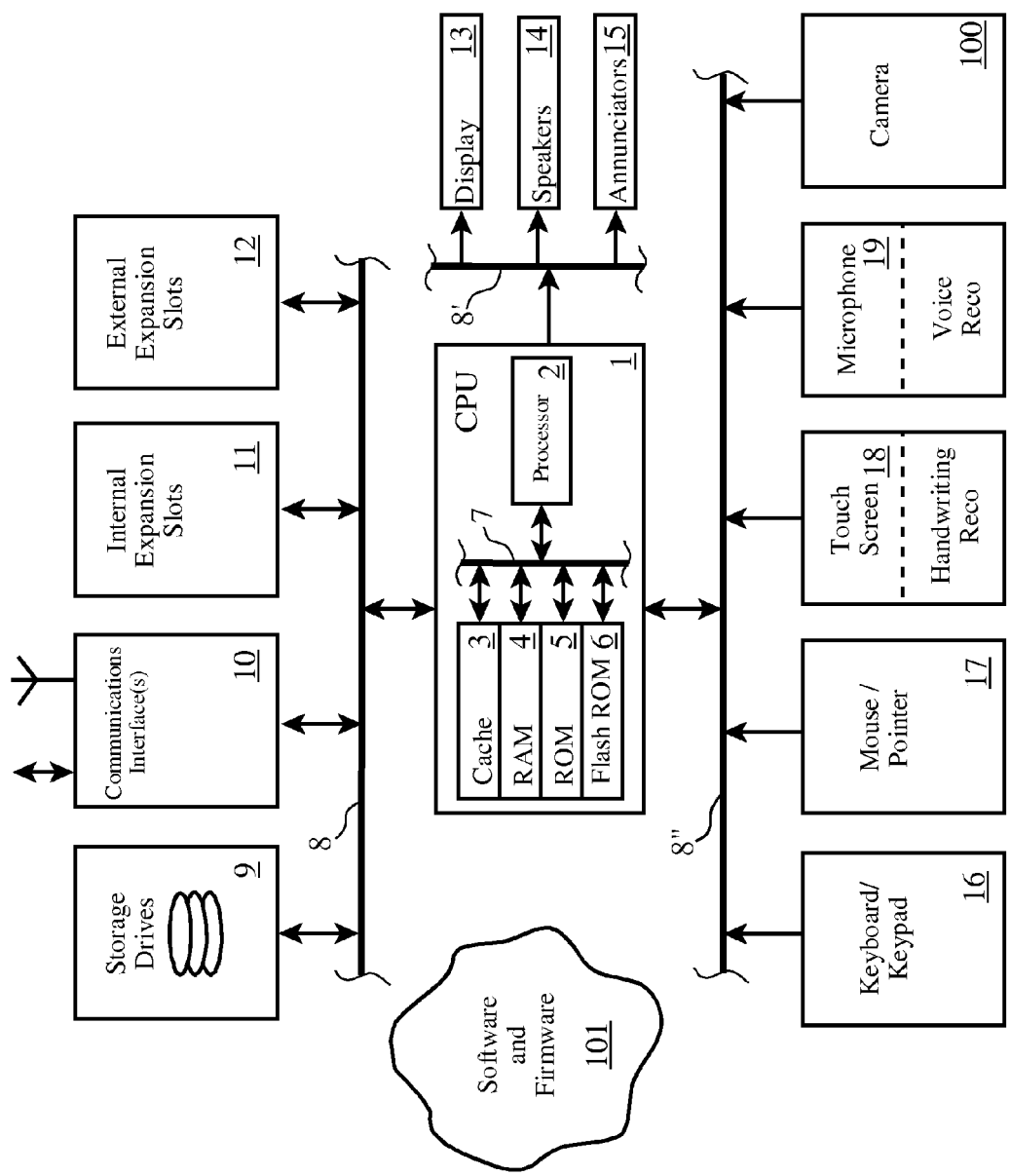
FIG. 1 depicts a generalized computing platform architecture, such as a personal computer, web application server computer, enterprise server, personal digital assistant, web-enabled wireless telephone, or other processor-based device.

We have developed a system and method for providing access security to storage partitions stored on replicated network storage devices. Each partition is associated with one of multiple secret keys which are shared with a file manager. The file manager acts as a key manager, issuing credentials to clients requesting access to a particular partition. The issued credentials include a network address for the partition to be accessed by the client.

The file manager can invalidate an original partition if the security of that partition is breached, and begin to redirect all new requests to replicated, uncompromised partitions by providing credentials with addresses pointing to replicas instead of addresses pointing to original partitions.

When a client presents a credential to a networked storage device, the device verifies the validity of the credential before allowing the client to perform the requested action on the data within the addressed partition. This allows the storage device to reject credentials which are based upon keys which have expired or compromised. If a key expires or is compromised, the file manager and storage device may obtain new secret keys from a trusted source, or may generate a secret key mutually using a proprietary or "standard" process such as the Diffie-Hellman process.

In another embodiment variation, the file manager may consider the expiration times of the secret keys shared between the file manager and the storage devices when deciding which replica to which the client is to be directed. As such, the file manager may attempt to issue credentials using keys which have the longest available validity time left on them.

In enhanced embodiments of our new system and method, the file manager may consider the number of credentials already issued to access a particular partition, and may distribute the access to replicas by issuing credentials with addresses pointing to replica partitions, thus providing load balancing functionality to the arrangement and increasing system performance and responsiveness.

In another enhanced embodiment, the load manager in cooperation with a replication manager may, upon detection of an intrusion or request to access a partition by an unauthorized user, isolate a partition for use only by the unauthorized user and redirect all requests from authorized users to other replica partitions. This allows the unauthorized user's activities to proceed apparently normally so that system administrators may gather information about the user and his or her activities. In a variation on this enhancement, the unauthorized user may be directed to use a partition which contains dummy data instead of true replica data. In yet another variation of this enhancement, a partition may be isolated for test and development purposes, re-enabling replication of the changes to the isolated partition after functionality of a new program or service has been verified.

Through support of partition-level access control, invalidation of entire storage devices is avoided as each partition may be individually invalidated in case of a security breach. Through support of replication, high availability, scalability, and rapid data recovery are supported. Additional functionality of load balancing, enhanced system administrator control over unauthorized user activities, and test and development activities are also realized by our new system and method.

DETAILED DESCRIPTION

Our new system and method are preferably realized as a feature or addition to the software already found present on well-known computing platforms such as personal computers, web application servers, enterprise servers, and web browsers. These common computing platforms include personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Turning to FIG. 1, a generalized architecture is presented including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera. One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc.

The computing platform is also provided with one or more software and firmware (101) programs to implement the desired functionality of the computing platforms.

Figure 2:
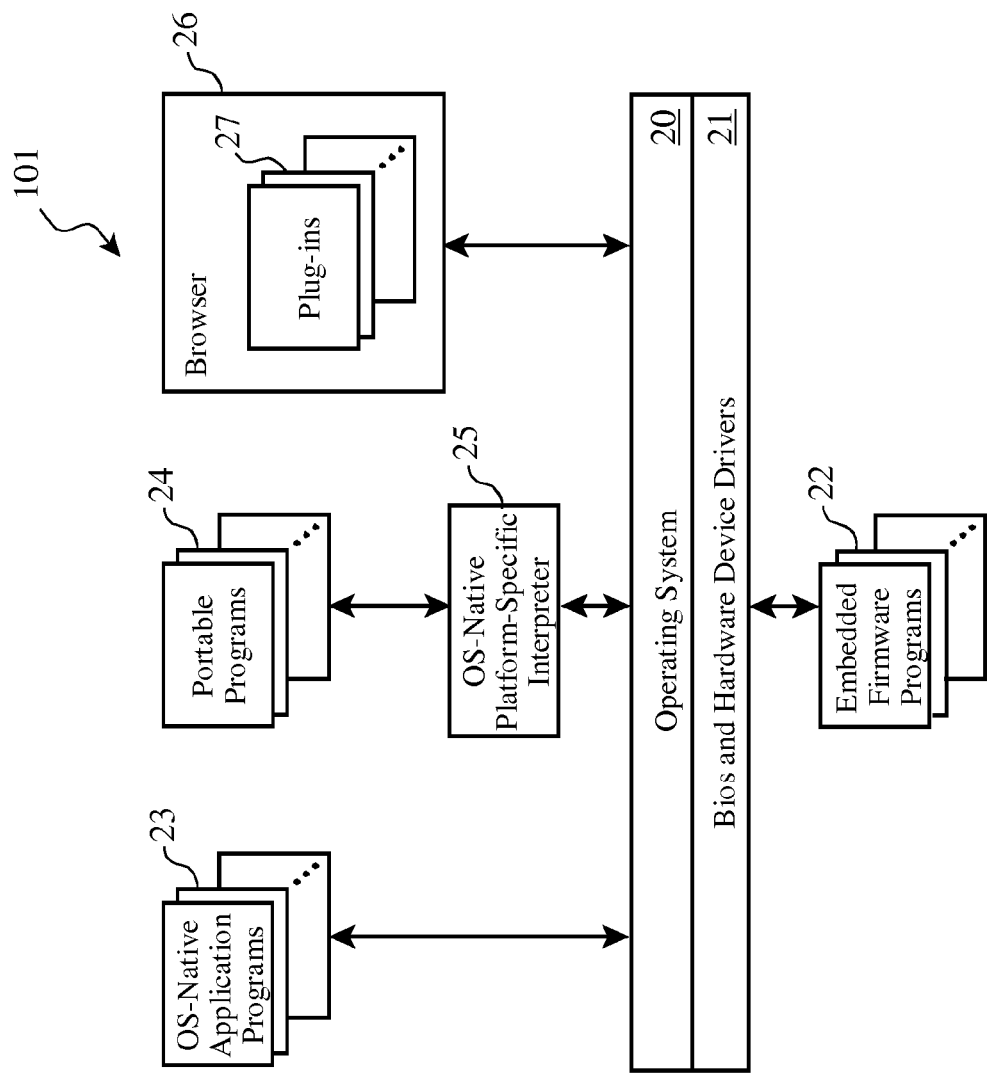
FIG. 2 shows a generalized organization of software and firmware associated with the generalized architecture of FIG. 1.
Figure 3:
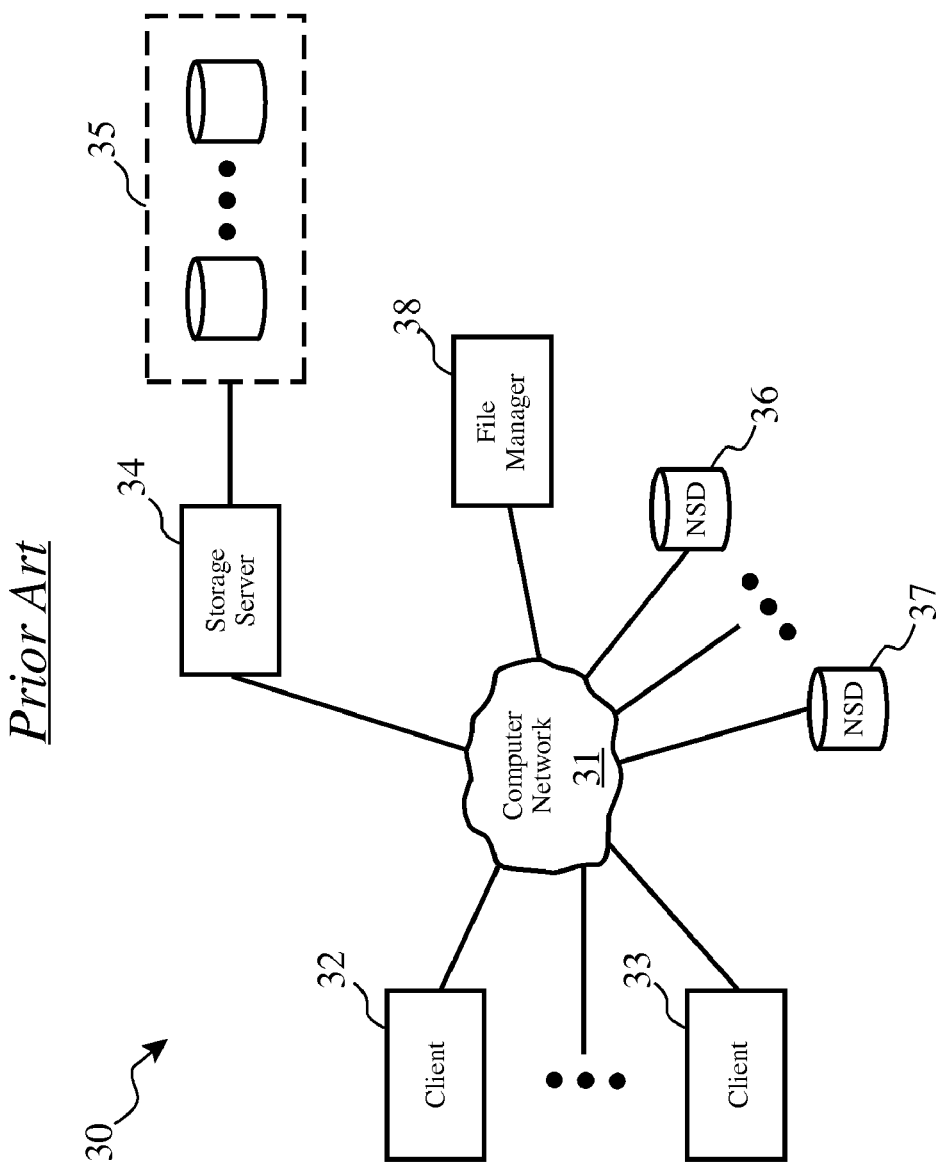
FIG. 3 illustrates a newer arrangement wherein storage devices are capable of interfacing to a computer network directly without intervention by a storage server.
Figure 4:
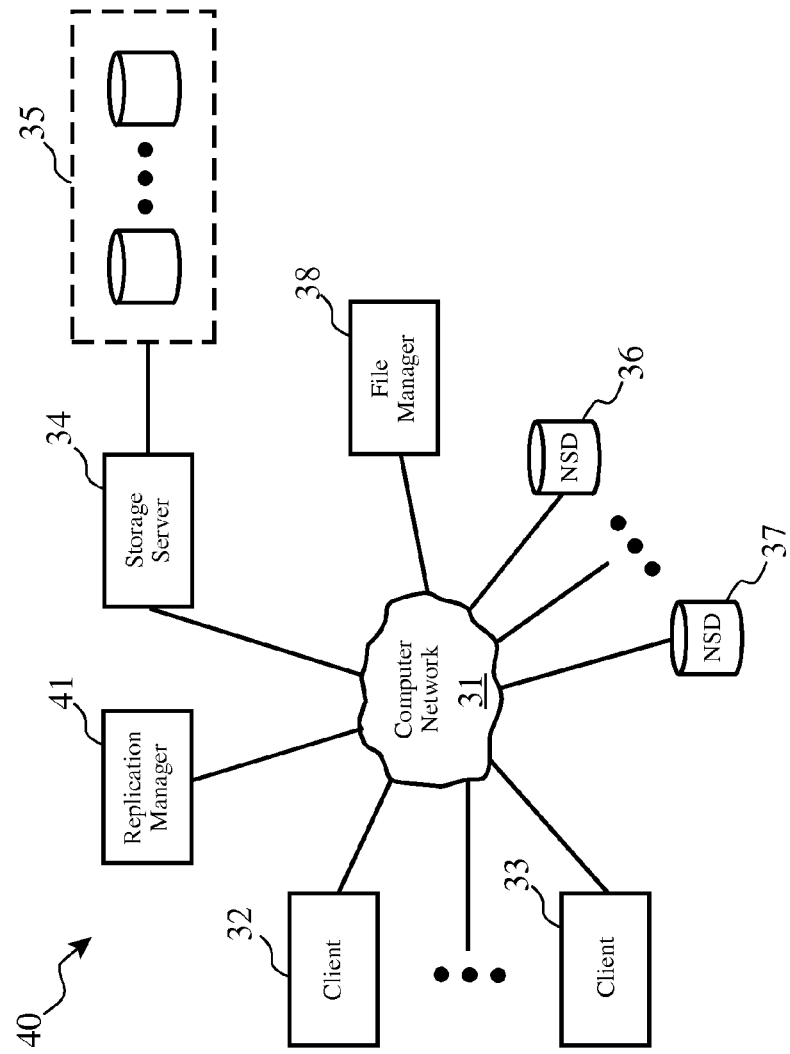
FIG. 4 augments the arrangement of FIG. 3 to illustrate replication concepts and functions.
Figure 5:
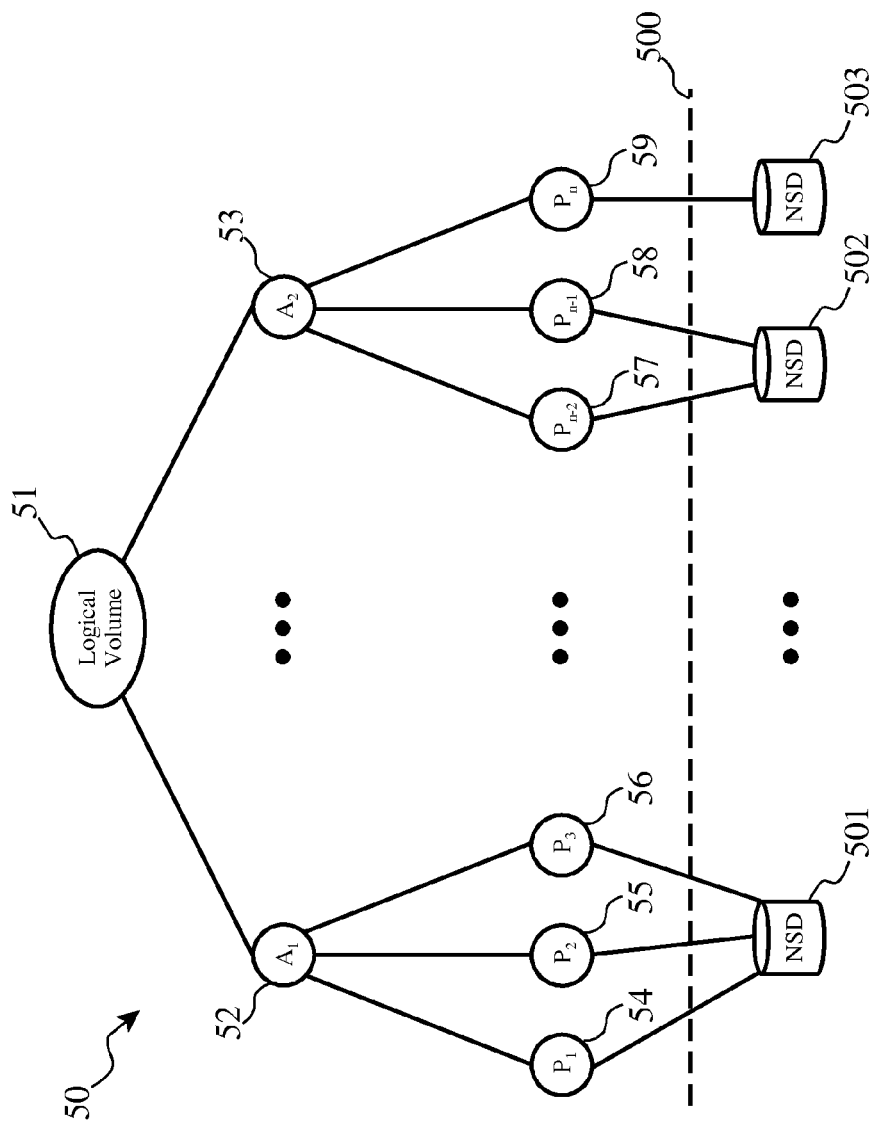
FIG. 5 provides a graphical depiction of the organization of stored data into partitions, and the mapping of those partitions to actual storage devices.

Turning to FIG. 2, more detail is given of a generalized organization of software and firmware (101) on this range of computing platforms. One or more operating system ("OS") native application programs (23) may be provided on the computing platform, such as word processors, spreadsheets, contact management utilities, address book, calendar, email client, presentation, financial and bookkeeping programs.

Additionally, one or more "portable" or device-independent programs (24) may be provided, which must be interpreted by an OS-native platform-specific interpreter (25), such as Java™ scripts and programs.

Often, computing platforms are also provided with a form of web browser or microbrowser (26), which may also include one or more extensions to the browser such as browser plug-ins (27).

The computing device is often provided with an operating system (20), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (21) are often provided to allow the operating system (20) and programs to interface to and control the specific hardware functions provided with the computing platform.

Additionally, one or more embedded firmware programs (22) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 2 describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

We now turn our attention to the description of the method of the invention and it's associated components. In one embodiment, it may be realized as a set of coordinated software products executing on a file manager, a networked storage device and a client computer through additions to existing software, plug-ins, or other extensible means of such systems. The software products may interact in "standard" or proprietary ways with other systems well-known in the art such as storage replication managers, computer network products and hardware, authentication and authorization engines, and trusted key sources. For example, the invention may be realized as a plug-in to Netscape's Navigator web browser on a client system, firmware extensions to a networked storage device from IBM, software extensions to a file manager such as IBM's WebSphere enterprise server product, software extensions to a replication manager product such as IBM's Lotus Notes product. These extensions and plug-ins may be specifically adapted to cooperate with an authentication and authorization server product such as WebSphere, and to intercommunicate between components of the arrangement using common or proprietary network facilities and protocols such as Transmission Control Protocol/Internet Protocol ("TCP/IP"), Data Encryption Standard ("DES"), Ethernet and various wireless network protocols and standards. It should be recognized, however, that these are just a few of suitable and available technologies, protocols, and models for use in realizing the present invention.

In our new security system for replicated storage arrangements, a file manager and one or more networked storage devices share secret keys, although the file manager does not act as a storage server for the NSD (e.g. it is not interposed between the storage device and the computer network).

Figure 6:
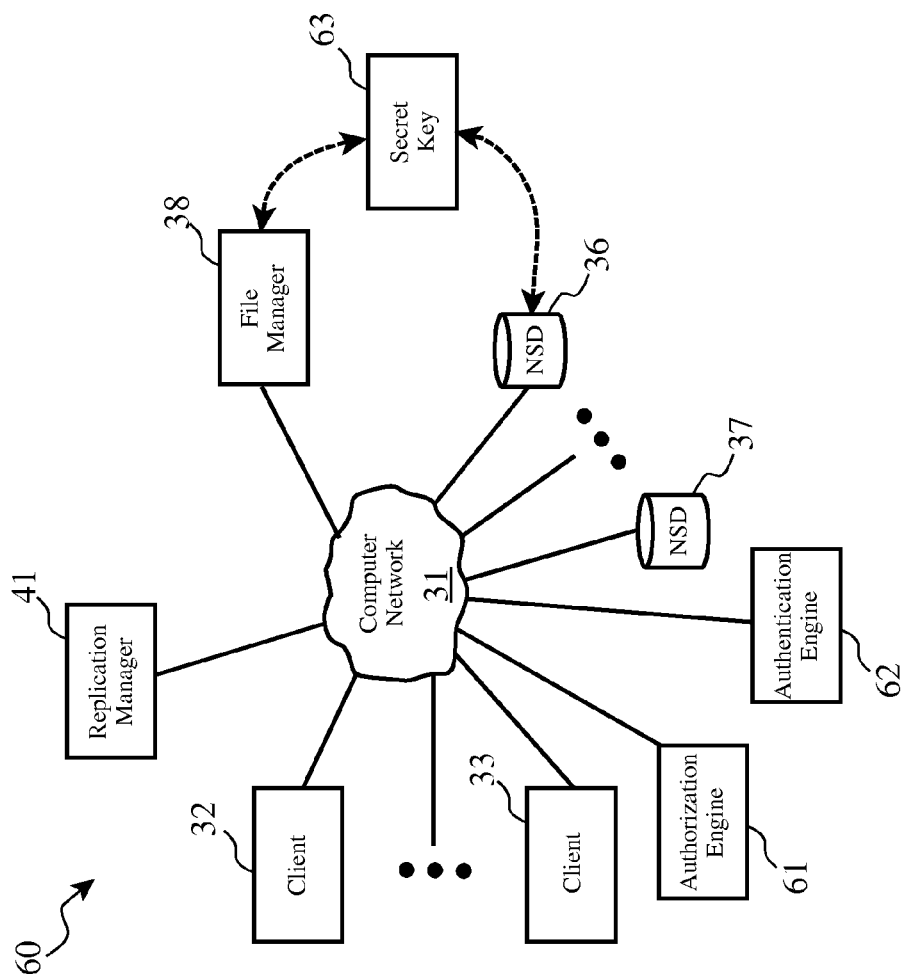
FIG. 6 illustrates the sharing of a secret key between a file manager and a networked storage device.
Figure 7:
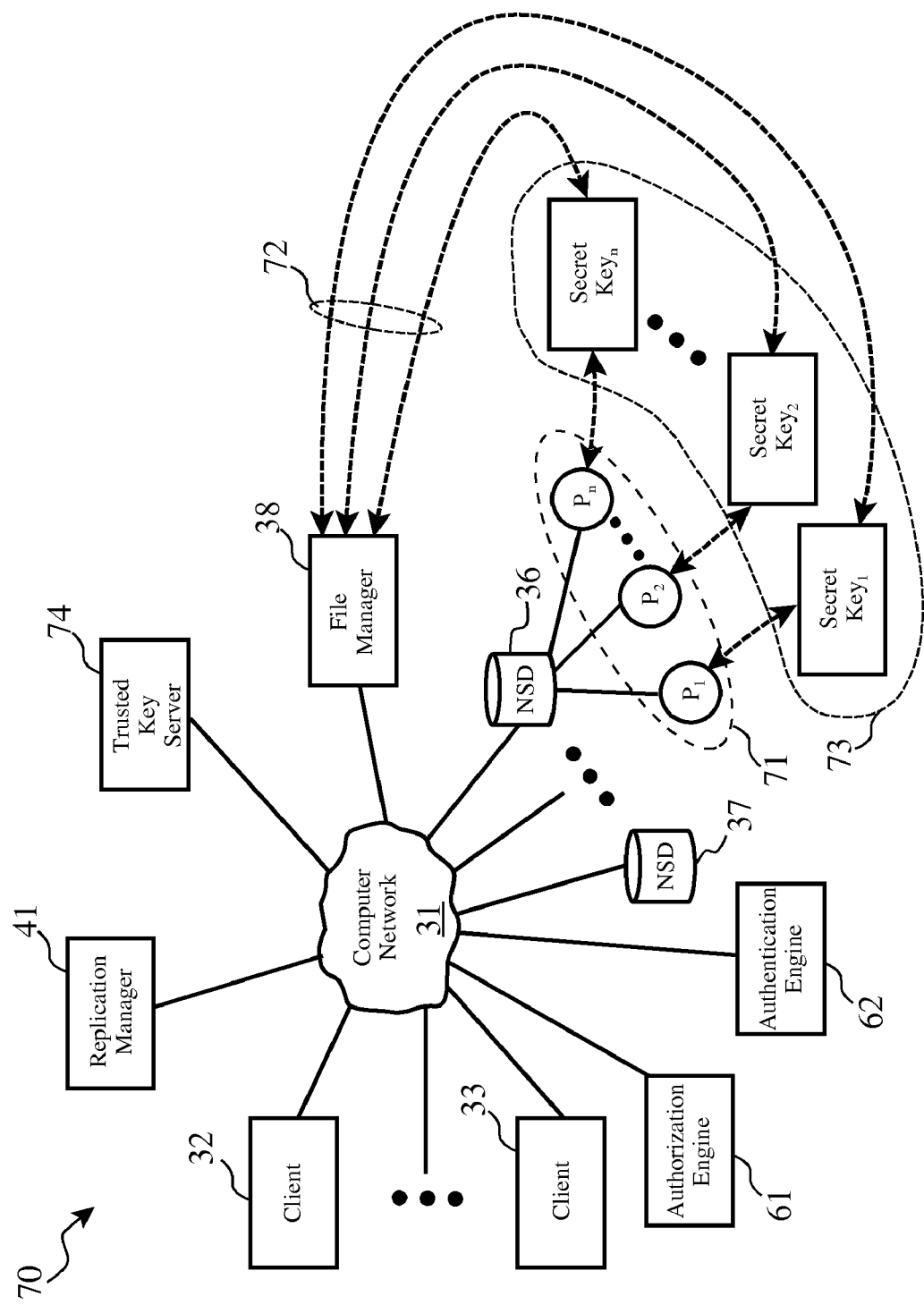
FIG. 7 illustrates our method of sharing a secret key between a file manager and each partition of data.

In an arrangement (60) as shown in FIG. 6, a client (32, 33) requesting access to an object on a storage device (36) initially sends a request to a file manager (38). The file manager (38) performs client authentication (62), authorization (61) and access checks, and grants a credential to the client which is encrypted using a secret key (63), which is shared by the storage device (36) and the file manager (38).

The client then sends this request to the storage device (36), which subsequently verifies the request that has been sent to it using the secret key (63). If the key were to be associated only with the storage device, and the key (63) becomes compromised, then the data on the storage drive may also be compromised, and all access credentials granted for access to this drive would be considered invalid.

Rather than allowing the compromising of a secret key resulting in invalidating an entire storage device, our new method and arrangement (70) associates (72) a set of N secret keys (73) to each partition $P_1, P_2, \ldots, P_n$ (71) on the storage device (36). These keys are shared with the file manager (38) through a key establishment process using a trusted key source (74) or a mutual key generation process between the file manager and network storage device (e.g. a Diffie-Hellman process or similar). Each file manager (38) may share keys with a plurality of partitions for a plurality of storage devices, although our diagrams illustrate just one storage device. With this arrangement and method, if a secret key shared by a file manager and a given partition is compromised, the security breach is limited only to that partition, and does not invalidate accesses to the entire storage device.

Each shared secret key can also be used to invalidate outstanding credentials efficiently. If the access permissions change for a large number of objects, any outstanding credentials that have already been granted by the file manager may subsequent to the change be invalidated to prevent access to objects for which the access permissions have changed. This invalidation is done by generation a new secret key between the file manager and the storage device where the partition is stored.

Figure 8:
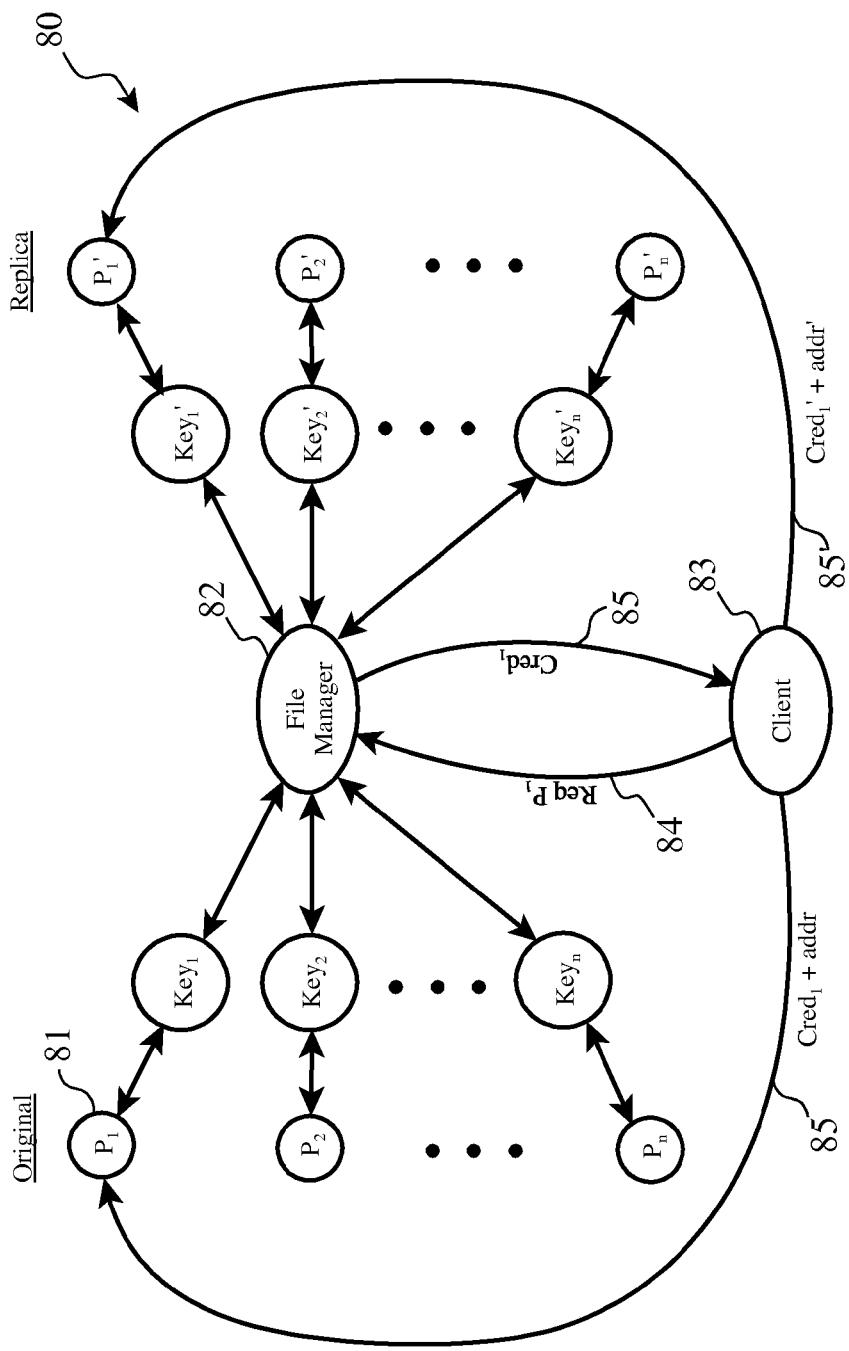
FIG. 8 shows a high level view of the interactions of a file manager, a client, and multiple keys and partitions.

Our new arrangement and processes support high availability and scalability in that a storage device attached to a network may be replicated, as shown (80) in FIG. 8. The file manager (82) associates keys ($Key_1, Key_2, \ldots Key_n$) with each original partition ($P_1, P_2, \ldots P_n$), as well as keys ($Key_1', Key_2', \ldots Key_n'$) with replica partitions ($P_1', P_2', \ldots P_n'$). One or more sets of replicas may be associated with additional keys, although FIG. 8 illustrates only one set of replica partitions and keys.

In some embodiments of our method, the keys for the replica partitions and the keys for the original partitions are not the same key values, although they may be equivalent in other embodiments with some reduction in the ability to provide dynamic load balancing (discussed later).

When the file manager (82) grants a credential (85) to a client (83) which is requesting (84) access to a partition (e.g. $P_1$) such as for reading or writing data to that partition, the credential is created to include an address of the original partition (85) or of a replica partition (85') to which the client must go for accessing the data. For example, in an embodiment employing Internet Protocol ("IP"), the address provided in the credential may be an IP address for the NSD on which the partition to be accessed is stored. As the replicated partition will normally be located on a different NSD from the original partition, different IP addresses are typically used (and given) for the original and replica partition(s).

By providing an address in the credential for the partition to which the client is directed, the file manager may invalidate an original partition, and may redirect new requests to a replica partition, thus providing immediate data recovery and security recourse.

It also allows the file manager to manage the load or amount of requests being served by a particular device housing a particular original or replica partition. The file manager considers the following factors when it issues a new credential to provide load balancing and to minimize the number of credential refreshes that are needed:

(a) the total number of credentials outstanding for a particular partition such that the load is distributed among the different replicas; and
(b) a validity period of the shared secret key when deciding to which replica the client is to be directed, and thus the file manager can avoid the expiration of credentials in an untimely manner due to the expiration of the shared secret key.

Figure 9:
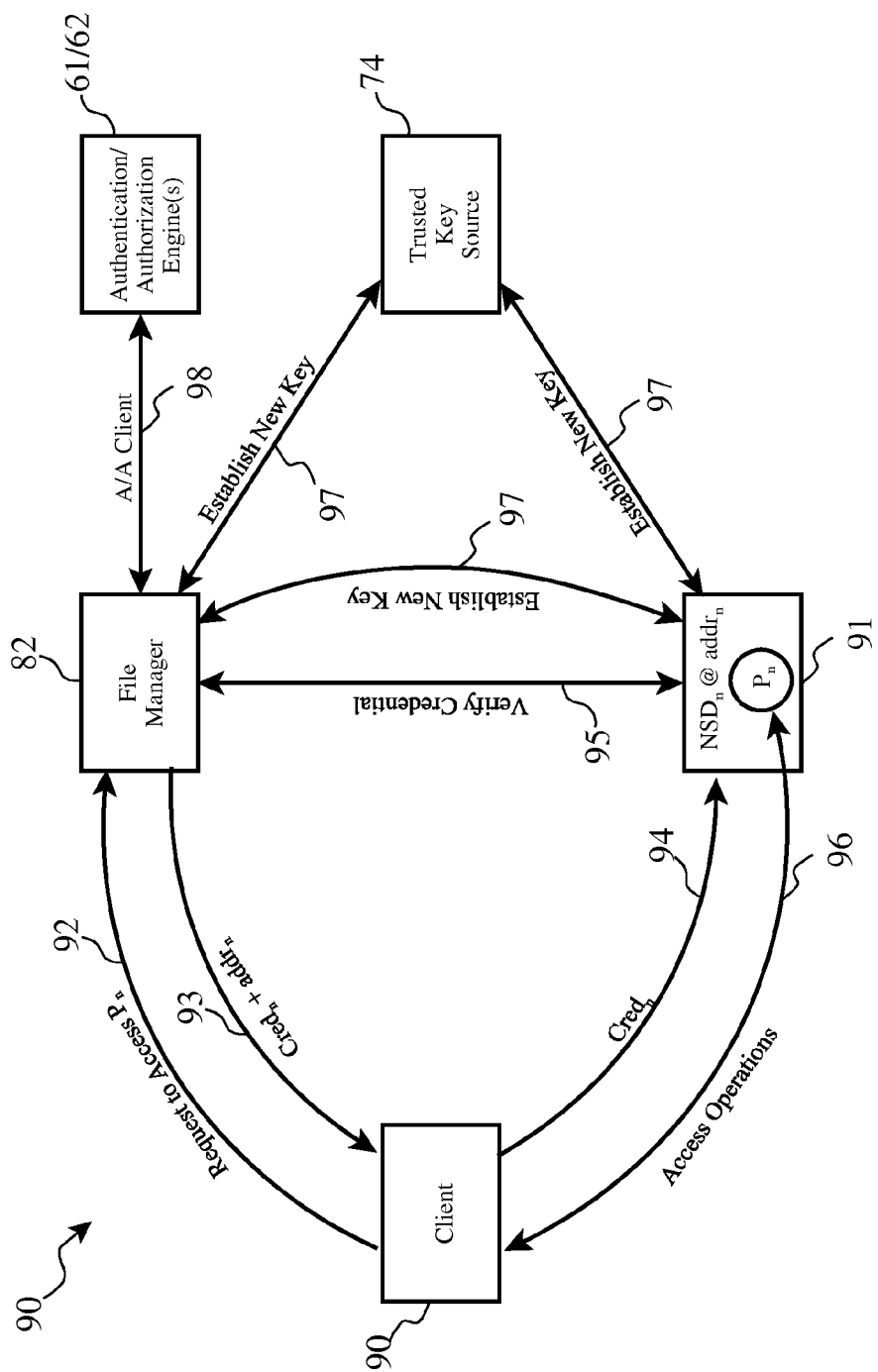
FIG. 9 provides a more detailed illustration of the process which is performed among a file manager, storage device, client, trusted key source, and authentication and authorization engine(s).

Turning to FIG. 9, the interactions (90) between a client, a file server, and a networked storage device are shown in more detail. A client (90) submits a request (92) to access a particular partition $P_n$ to a file manager (82). The file manager may perform client authentication and authorization locally, such as using a local list of authorized client actions, or by conducting authorization and authentication operations (98) with one or more authentication and authorization engine(s) (61, 62).

If the client is authenticated and authorized to perform the action requested on or with the partition $P_n$, then the file manager (82) determines which partition replica (or the original) for the client to use based upon security validation of the replicas (e.g. which replicas are still valid and uncompromised) and outstanding number of credentials issued to each replica. The file manager then assembles a credential including an address to the NSD hosting the partition replica (or original partition) to which the client is to be directed. This credential is then returned (93) to the client, who then forwards (94) the credential to the addressed NSD (91) hosting the partition replica (or original) $P_n$.

The NSD periodically checks with the file manager to see if any keys for partitions which the NSD stores have been revoked. If a secret key has not been revoked, the NSD decrypts the encrypted portion of the credential and verifies that the credential is consistent with the access being attempted by the client. If the credential is still valid and the access being attempted is consistent with the credential, the NSD (91) allows the client (96) to perform the requested access or actions on the partition $P_n$.

If, at the time of verifying (95) a credential's validity, the NSD (91) determines that the secret key shared between the targeted partition $P_n$ and the file manager has expired or been compromised, a process may be performed to establish a new shared secret key.

As previously described, if at the time of credential verification (95) it is determined that a partition's security has been breached, the verification can be denied which will lead to the NSD refusing the client's access, followed by the client requesting a new credential from the file manager. The file manager would, then, issue a new credential addressed towards an uncompromised replica of the requested partition.

In a variation embodiment of our process, tracking and control of unauthorized users (e.g. hackers) can be made without alerting the user to their being detected, and without compromising data further than during their initial access. In this variation, when it is determined that a user is attempting to access a partition to which he or she is not authorized to access, the access may be allowed to a particular replica of the partition. Other users who are authorized would then be directed to other replicas such that the unauthorized user's partition is isolated. The replication manager would also be configured not to replicate changes made to the isolated partition.

The unauthorized user would then be allowed access to the isolated partition seemingly normally, although system administrators could be alerted to the access such that they could monitor the user's actions and attempt to locate the user. By avoiding outright denial of access to the partition, the unauthorized user is not made aware of the fact that he or she has been detected, and may continue his or her intended actions thus giving the system administrator an opportunity to locate and identify the user.

In another variation of this process wherein a partition is isolated for access by an unauthorized user, the user may be redirected to a partition containing "dummy" or fake data seemingly normally. For example, if an authorized user attempts access to a partition which contains sensitive data regarding military or government operations, he or she may be directed towards a non-replica partition containing data which would appear to be correct and real, but which is in fact not correct, thus providing misinformation to the would-be hacker.

In a more traditional use of this variation, certain users having restricted privileges may be allowed to access and modify the contents of a copy of a partition which is isolated for the user's operations. Prior to replicating his or her changes throughout the other replica partitions, a system administrator could review and approve the changes such that any unwanted changes are blocked from replication. This may be useful in many situations, such as an environment testing a new server application which must modify the contents of a replicated database. The application could be executed on an isolated partition (e.g. isolated replica of the database), and then the changes to the database verified by an administrator. If all the results are acceptable, the administrator can remove the replication block on the isolated partition, and the replication manager would synchronize all other copies of the partition to the changes.

While details have been provided regarding certain aspects of one or more embodiments of the invention, it will be recognized by those skilled in the art that variations of the illustrative embodiments may be made without departing from the scope of the present invention, including but not limited to use of alternate programming methodologies, employing alternate computer network technologies, use of public/private key pairs, key establishment and sharing protocols, etc. Therefore, the scope of the present invention should be determined by the following claims.

What is claimed is:

1. An article of manufacture for use in a replicated networked storage domain of a at least one original data partition and one or more replica data partitions, each partition being stored on a storage device having a network address, the article comprising:
   a computer readable medium suitable for storage of software; and
   one or more software programs stored on said medium configured to cause a processor to perform the steps of:
   (a) associating with each partition a secret key;
   (b) sharing said secret keys between said storage devices and a file manager;
   (c) requesting access to a specific partition by a client; and
   (d) accessing said specific partition by said client using a credential encrypted by the key associated with the specific partition and including a network address of a storage device which stores the partition.

2. The article as set forth in claim 1 wherein said software for accessing said selected partition further comprises software for verifying validity of said credential by said storage device, and allowing said client access only if said credential is verified.

3. The article as set forth in claim 2 wherein said software for verifying a credential further comprises software for denying access to said requesting client if the credential presented by the client is encrypted with a key which is subject to a condition selected from the group of invalidation, expiration, or compromisation.

4. The article as set forth in claim 3 wherein said software for verifying a credential further comprises software for establishing a new shared key.

5. The article as set forth in claim 4 wherein said software for establishing a new shared key comprises software for performing a Diffie-Hellman process.

6. The article as set forth in claim 1 wherein said software for selecting a partition to which the client is to be directed comprises software for determining an existing load level among partition originals and replicas, and selecting a partition which is least loaded.

7. The article as set forth in claim 1 wherein said software for selecting a partition to which the client is to be directed comprises software for selecting a valid, uncompromised partition original or replica.

8. The article as set forth in claim 1 wherein said software for selecting a partition to which the client is to be directed comprises software for detecting attempted access to a partition by an unauthorized or unauthenticated user and isolating a partition for exclusive use by that user.

9. The article as set forth in claim 1 wherein said software for selecting a partition to which the client is to be directed comprises software for detecting attempted access to a partition by an unauthorized or unauthenticated user and selecting a partition which is other than an original or true replica of the requested partition.

10. The article as set forth in claim 1 wherein said software for selecting a partition to which the client is to be directed comprises software for detecting requested access to a partition by a designated test or development client, and isolating a partition for exclusive use by that client.

11. The article as set forth in claim 10 further comprising synchronizing said isolated partition with its replicas upon completion of accessing by said test or development client.

12. A method in a replicated networked storage domain of at least one original data partition and one or more replica data partitions, each partition being stored on a storage device having a network address, the method comprising:
   associating with each partition a secret key;
   sharing said secret keys between said storage devices and a file manager;
   requesting access to a specific partition by a client; and
   accessing said specific partition by said client using a credential encrypted by the key associated with the specific partition and including a network address of a storage device which stores the partition.

13. The method as set forth in claim 12 wherein said step of accessing said selected partition further comprises verifying validity of said credential by said storage device, and allowing said client access only if said credential is verified.

14. The method as set forth in claim 13 wherein said step of verifying a credential further comprises denying access to said requesting client if the credential presented by the client is encrypted with a key which is subject to a condition selected from the group of invalidation, expiration, or compromisation.

15. The method as set forth in claim 14 wherein said step of verifying a credential further comprises establishing a new shared key.

16. The method as set forth in claim 15 wherein said step of establishing a new shared key comprises performing a Diffie-Hellman process.

17. A security system in a replicated networked storage domain of at least one original data partition and one or more replica data partitions, each partition being stored on a storage device having a network address, the system comprising:
- a secret key associated with each partition, each key being shared between a file manager and a storage device on which a partition is stored;
- a partition selector operable by a file manager for selecting an original or replica partition to which a client is to be directed responsive to a request for access to a partition from said client;
- a credential encrypted by the secret key shared with the selected partition's storage device and the file manager, and including a network address corresponding to the storage device which stores the selected partition; and
- a partition access controller adapted to receive and validate said credential from a client, and to allow access operations by the requesting client to the requested partition.

18. The system as set forth in claim 17 wherein said partition access controller further comprises a key establisher configured to acquire a new key associated with a partition shared between a storage device and a file manager.

19. The system as set forth in claim 18 wherein said key establisher is adapted to perform a Diffie-Hellman process.

20. The system as set forth in claim 19 wherein said partition selector comprises a load determiner for determining an existing load level among partition originals and replicas, and a least-loaded partition selector.

* * * * *